US008664799B2

(12) United States Patent
Ogasawara et al.

(10) Patent No.: US 8,664,799 B2
(45) Date of Patent: Mar. 4, 2014

(54) APPARATUS INCLUDING POWER SUPPLY CIRCUIT

(75) Inventors: Yasufumi Ogasawara, Tachikawa (JP); Yuichi Naoi, Tokorozawa (JP); Shinji Takagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 12/817,438

(22) Filed: Jun. 17, 2010

(65) Prior Publication Data

US 2010/0320984 A1 Dec. 23, 2010

(30) Foreign Application Priority Data

Jun. 22, 2009 (JP) ................................ 2009-148010

(51) Int. Cl.
*H02J 1/10* (2006.01)

(52) U.S. Cl.
USPC ............................................ 307/80; 323/283

(58) Field of Classification Search
USPC ............................................ 307/80; 323/283
See application file for complete search history.

(56) References Cited

U.S. PATENT DOCUMENTS

| | | | | |
|---|---|---|---|---|
| 5,519,417 | A * | 5/1996 | Stephany et al. | 347/14 |
| 2003/0043218 | A1 | 3/2003 | Murata | |
| 2005/0174369 | A1 * | 8/2005 | Masuda | 347/5 |
| 2006/0071961 | A1 * | 4/2006 | Tamura | 347/10 |

FOREIGN PATENT DOCUMENTS

| | | | |
|---|---|---|---|
| JP | 09-174832 | A | 7/1997 |
| JP | 2002-186259 | A | 6/2002 |
| JP | 2003-145892 | | 5/2003 |
| JP | 2005-033939 | A | 2/2005 |

* cited by examiner

*Primary Examiner* — Alexander H Taningco
*Assistant Examiner* — Haihui Zhang
(74) *Attorney, Agent, or Firm* — Canon USA Inc. IP Division

(57) ABSTRACT

An apparatus which has a load that consumes a predetermined amount of electric power per unit time includes a power source circuit configured to generate a voltage for driving the load, a capacitor which is connected to a supply line for supplying electric power to the load from the power source circuit and configured to stabilize a potential of the load, a first supply circuit which can supply electric power smaller than the predetermined amount to the capacitor and can discharge a charge from the capacitor, a second supply circuit which can supply electric power larger than the predetermined amount to the capacitor, a switch circuit configured to operate each of the first supply circuit and the second supply circuit, and a holding circuit configured to hold information based on the operation of the first supply circuit.

20 Claims, 5 Drawing Sheets

APPARATUS INCLUDING POWER SUPPLY CIRCUIT

BACKGROUND OF THE INVENTION

1. Field of the Invention

The present invention relates to an apparatus which includes a power supply circuit.

2. Description of the Related Art

A recording apparatus converts electric power into heat with using an electrothermal conversion device disposed to a recording head, and discharges ink onto a sheet surface by using the heat. As discussed in Japanese Patent Application Laid-Open No. 2003-145892, a capacitor (e.g., electrolytic capacitor) is provided to supply the electric power with a stable voltage value to an electrothermal conversion device. A power supply circuit that supplies the electric power to a recording head includes a semiconductor switch, e.g., a field-effect transistor (FET) to perform a switching operation of the semiconductor switch as needed. The power supply circuit also includes a discharge circuit configured to discharge charges stored in the capacitor to the earth (ground) when a recording apparatus does not perform recording operation.

However, if electric power is supplied from a power source upon starting the recording apparatus or before starting the recording operation, an inrush current with a large current value can be generated. This is because the amount of charges stored in the capacitor is small and a potential difference is thus large between the capacitor and the power source. Therefore, when a circuit that suppresses the current value is provided, a circuit scale is increased, thereby raising up costs.

SUMMARY OF THE INVENTION

The present invention is directed to an apparatus such as a recording apparatus.

According to an aspect of the present invention, an apparatus which has a load that consumes a predetermined amount of electric power per unit time includes a power source circuit configured to generate a voltage for driving the load, a capacitor which is connected to a supply line for supplying electric power to the load from the power source circuit and configured to stabilize a potential of the load, a first supply circuit which can supply electric power smaller than the predetermined amount to the capacitor and can discharge a charge from the capacitor, a second supply circuit which can supply electric power larger than the predetermined amount to the capacitor, a switch circuit configured to operate each of the first supply circuit and the second supply circuit, and a holding circuit configured to hold information based on the operation of the first supply circuit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
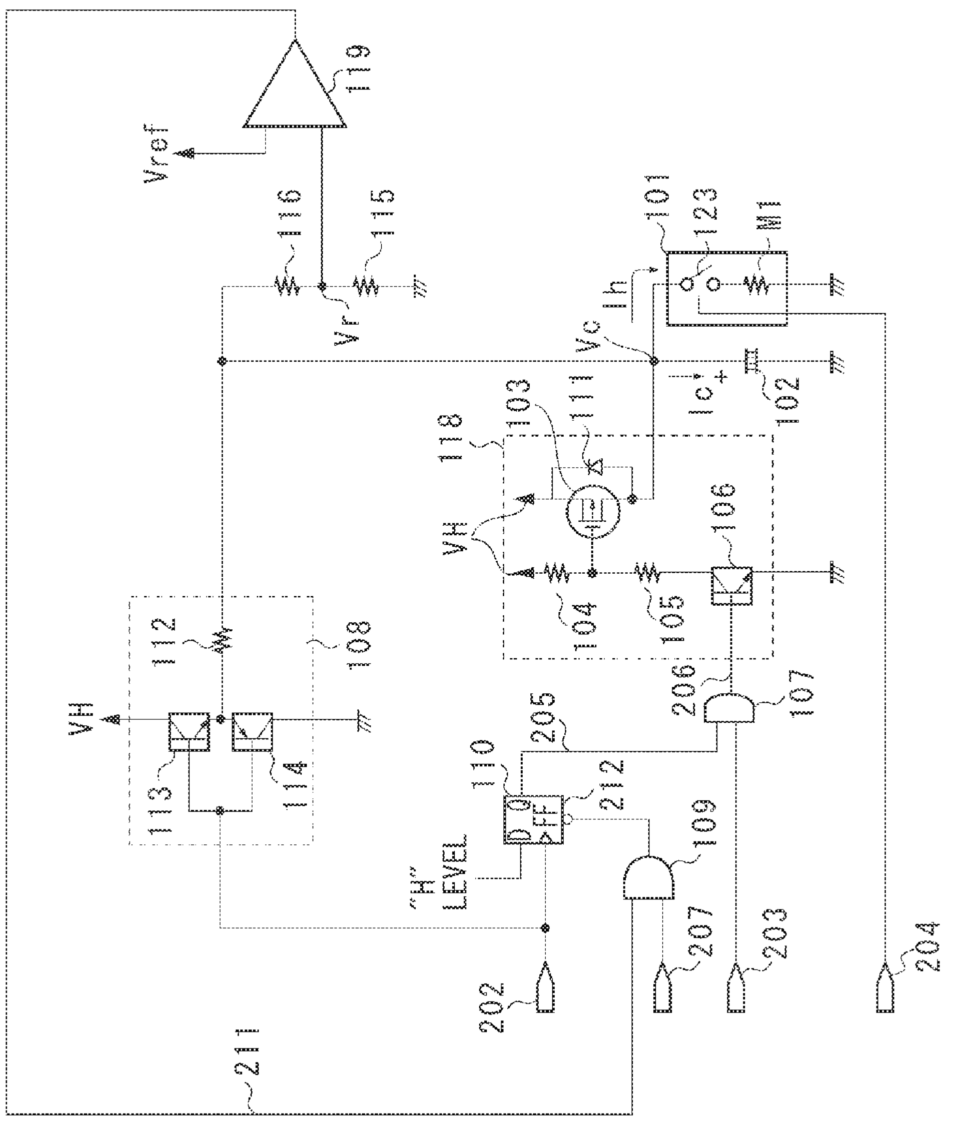
FIG. 1 illustrates a configuration of a power supply circuit according to an exemplary embodiment of the present invention.

FIG. 1 illustrates a power supply circuit (power supply device) that supplies electric power to a load. A load 101 is, e.g., a recording head. The recording head 101 turns on a switch 123 according to a signal 204, and drives a recording element (heater H1) to discharge ink. Referring to FIG. 1, for a brief description, the recording head 101 includes one recording element.

A capacitor 102 is arranged to stabilize a voltage of the recording head 101. A first supply circuit 108 and a second supply circuit 118 are input a voltage VH output by a power source circuit 117, and supplies electric power to the recording head 101. The first supply circuit 108 and the second supply circuit 118 are connected in parallel to an electric power supply line that supplies the electric power to the recording head 101 from the power source circuit 117.

The first supply circuit 108 can discharge charges stored in the capacitor 102. The first supply circuit 108 includes a push-pull circuit having transistors 113 and 114. A resistor 112 is a resistive element that limits the current supplied from the power source circuit 117. The first supply circuit 108 is a charge/discharge circuit that performs a charge operation when a signal 202 is at a high level and a discharge operation when the signal 202 is at a low level. The transistors 113 and 114 are internal-resistor type transistors.

The second supply circuit 118 is a charge circuit which includes a field-effect transistor (FET) 103, a diode 111, resistors 104 and 105, and a transistor 106. The diode 111 is disposed to flow back the charges stored in the capacitor 102 when the power source circuit 117 instantaneously interrupts. The transistor 106 is a bias resistor transistor (digital transistor).

A latch circuit 110 as a holding circuit holds a logical level of the signal 202. When the logical level of the signal 202 is high, the latch circuit 110 outputs a signal 205 at a high level. On the other hand, when the logical level of the signal 202 is low, the latch circuit 110 outputs the signal 205 at a low level.

A signal 212 is input to a reset terminal of the latch circuit 110. The latch circuit 110 receives input of the signal 212, and then initializes information to be held. When the latch circuit 110 is initialized, the signal 205 is set to the low level.

When a signal 211 or a signal 207 is input, a logical circuit 109 sets the signal 212 to the low level. When a value of a voltage Vr is lower than a predetermined value Vref or the signal 207 is input, the logical circuit 109 outputs the signal 212 at the low level. Resistors 115 and 116 divide a voltage Vc of the capacitor 102 and generate the voltage Vr. A comparator circuit 119 compares the reference voltage Vref with the voltage Vr and, when the voltage Vr is lower than the reference voltage Vref, outputs the signal 211. Agate circuit 107 outputs a signal 206 as a result of logical product of the signal 205 output from the latch circuit 110 and a signal 203 to the second supply circuit 118.

Figure 3:
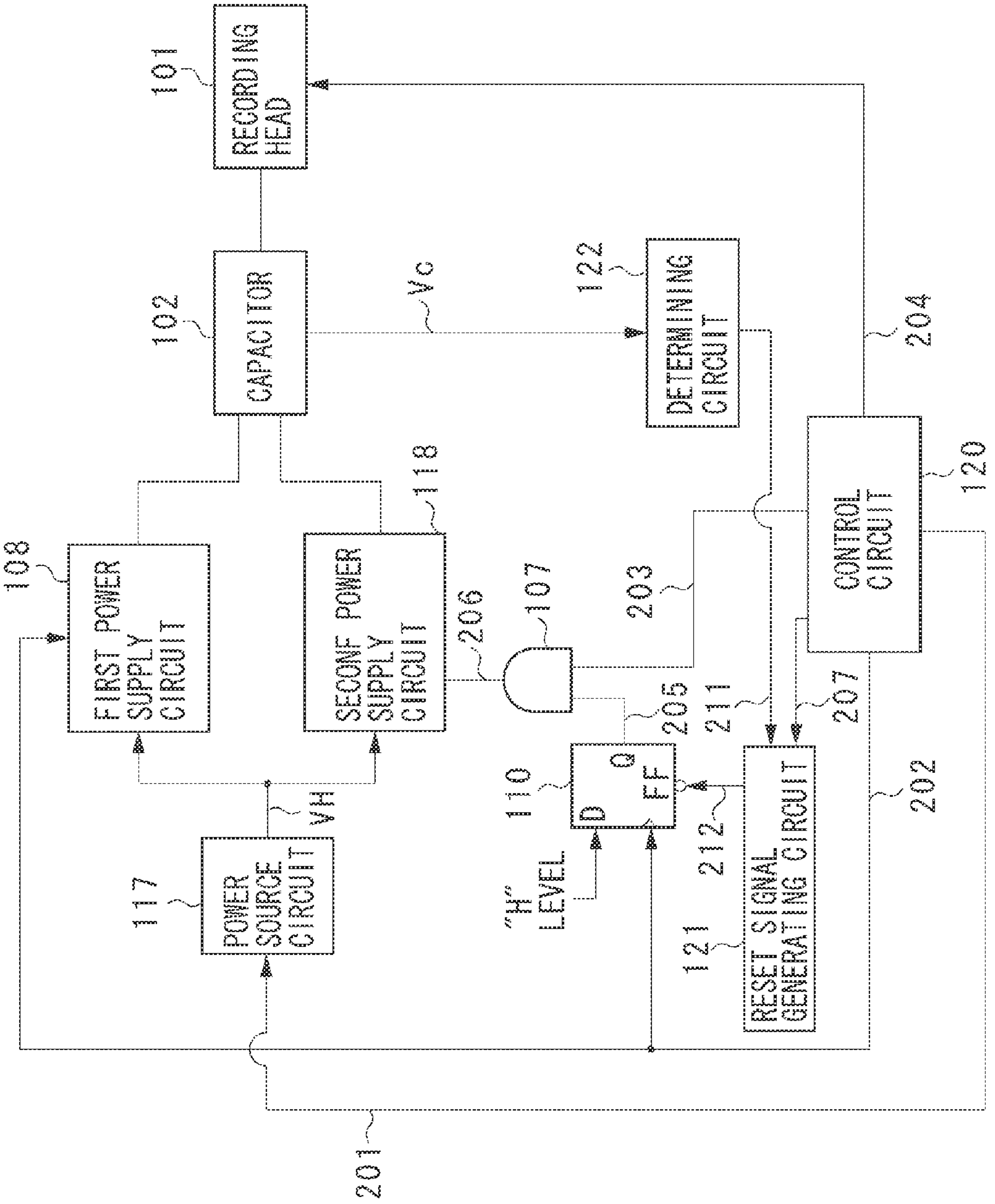
FIG. 3 is a block diagram illustrating a recording apparatus according to the exemplary embodiment.

FIG. 3 illustrates control for supplying electric power to the recording head 101 in the recording apparatus. A control circuit 120 controls operations of the recording head 101, the first supply circuit 108, and the second supply circuit 118. The control circuit 120 includes, e.g., a central processing unit (CPU) or an application specific integrated circuit (ASIC). The control circuit 120 further includes a read-only memory (ROM) that stores a program executed by the CPU and a random access memory (RAM) that stores data used by the CPU.

The power source circuit 117 is an alternating current and direct current (AC/DC) converting circuit that converts an AC voltage input from a commercial power supply into a DC voltage. The power source circuit 117 generates a voltage VH (e.g., 20 V) and a logic voltage (e.g., 5 V), supplies the voltage VH to a power supply circuit 100, and further supplies the logic voltage to the control circuit 120.

The power source circuit 117 is input a signal 201 from the control circuit 120, and outputs the voltage VH. The latch circuit 110 latches the signal 202 output from the control circuit 120. Further, the latch circuit 110 enters a reset state with the signal 207 output from the control circuit 120.

The gate circuit 107 is input a signal output from the latch circuit 110 and the charge control signal 203 output from the control circuit 120, and controls the signal 206 to the second supply circuit 118. The second supply circuit 118 supplies the electric power to the recording head 101 based on the signal 206.

A reset signal generating circuit 121 generates the signal 212 that initializes the latch circuit 110. When a determining circuit 122 determines that a potential of the capacitor 102 is lower than a threshold value or receives an instruction for initialization from the control circuit 120, the reset signal generating circuit 121 outputs the signal 212. The determining circuit 122 corresponds to the resistors 115 and 116 and the comparator circuit 119 illustrated in FIG. 1.

Next, a description is given of a relationship between electric energy that can be supplied by the two first and second power supply circuits 108 and 118 per unit time and power consumption of the recording head 101 per unit time. The first supply circuit 108 can supply first electric energy, and the second supply circuit 118 can supply second electric energy. Then, a relation is given of "the first electric energy"<"the second electric energy". That is, the second electric energy is larger than the first electric energy. When third electric energy is the maximum electric energy (electric power required for driving the recording element) that is consumed by the recording head 101 in the recording operation, a relation is given of "the first electric energy"<"the third electric energy"<"the second electric energy". That is, the third electric energy is larger than the first electric energy, and is smaller than the second electric energy.

Figure 2:
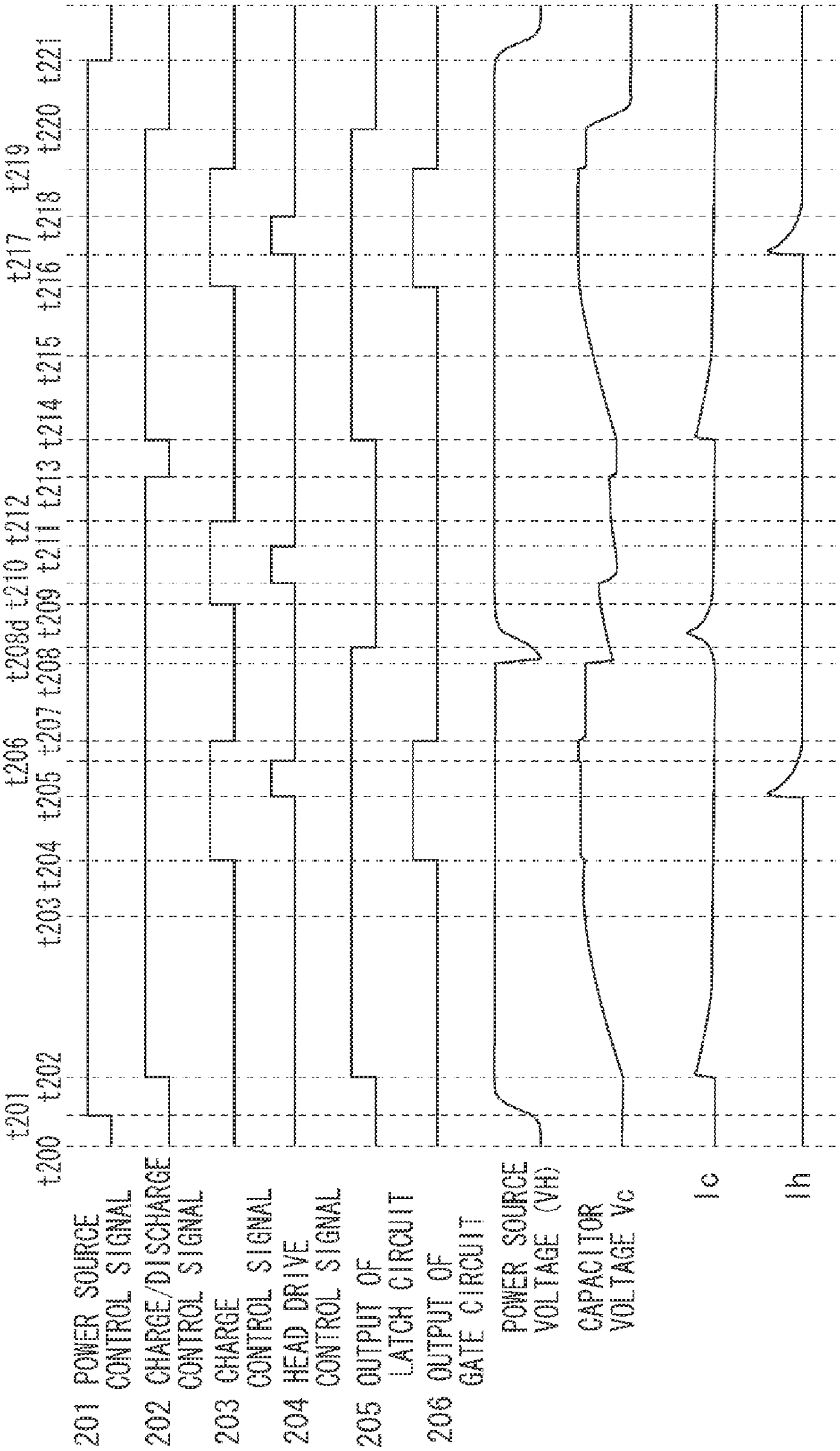
FIG. 2 is a timing chart illustrating timing according to the exemplary embodiment.

FIG. 2 is a timing chart illustrating states of a voltage and current in the power source supply with the configurations illustrated in FIGS. 1 and 3. The time passes from timings t200 to t221.

When the signal 201 reaches the high level, an output voltage of the power source circuit 117 gradually rises, and reaches a predetermined voltage V1 at the timing t202. During the time for the timings t201 to t202, the capacitor 102 is not charged.

When the charge/discharge control signal 202 reaches the high level from the timing t202, the first supply circuit 108 performs charge processing of the capacitor 102. A voltage VC of the capacitor 102 gradually increases, and reaches a voltage V2 at the timing t203. The voltage V2 has the potential slightly lower than that of the voltage V1. After detecting the rise of the charge/discharge control signal 202 at the timing t202, the latch circuit 110 sets the level of an output Q (signal 205) to the high level.

The control circuit 120 outputs the charge control signal 203 at the timing t204. The gate circuit 107 is inputs the charge control signal 203 at the high level and the signal 205 at the high level, thereby outputting the signal 206 at the high level. The second supply circuit 118 is input the signal 206 and performs the charge processing of the capacitor 102. Thus, the voltage Vc of the capacitor 102 reaches the voltage V1 after the timing t204.

At the timing t205, the control circuit 120 outputs a pulse-shaped (rectangular wave) head drive control signal 204 to discharge the ink from the recording head 101. Along with the operation, the recording head 101 starts driving. The drive operation of the recording head 101 consumes the electric power, and the second supply circuit 118 supplies the electric power to the recording head 101. At the timing t207 after ending the drive operation of the recording head 101, the control circuit 120 sets the head drive control signal 204 to the low level. As described above, before and after a period for recording operation of the recording head 101, the electric power is supplied from the second supply circuit 118 to the recording head 101 by the control of the control circuit 120. At the timings t216 to t219, the control is similarly performed.

Next, a description is given of the case where the voltage output from the power source circuit 117 temporarily decreases due to the instantaneous interruption at the timing t208. The charges stored in the capacitor 102 flows to the power source side via the diode 111. Consequently, the voltage Vc of the capacitor 102 sharply drops after the timing t208.

The determining circuit 122 outputs the signal 211 when the voltage Vr obtained by dividing the voltage Vc is lower than the threshold value i.e. the voltage Vref. The logical circuit 109 is input the signal 211, thereby outputting the signal 212 to the latch circuit 110. The latch circuit 110 receives the signal 212 and releases a latch operation. Therefore, the latch circuit 110 sets the level of the output Q (signal 205) to the low level at the timing t208*d*.

Thus, even if the control circuit 120 outputs the charge control signal 203 at the timing t209, the gate circuit 107 does not output the signal 206. As a consequence, the second supply circuit 118 does not supply the electric power to the capacitor 102. Accordingly, influx of large current (an inrush current) to the capacitor 102 can be prevented.

At the timing t214, if the control circuit 120 outputs the charge/discharge control signal 202, the latch circuit 110 detects the rise of the charge/discharge control signal 202 and sets the output Q (signal 205) at the high level. Therefore, when the control circuit 120 outputs the charge/discharge control signal 202 before starting to drive the recording head 101, for example, if the instantaneous interruption occurs, the capacitor 102 can be charged in advance.

Figure 4:
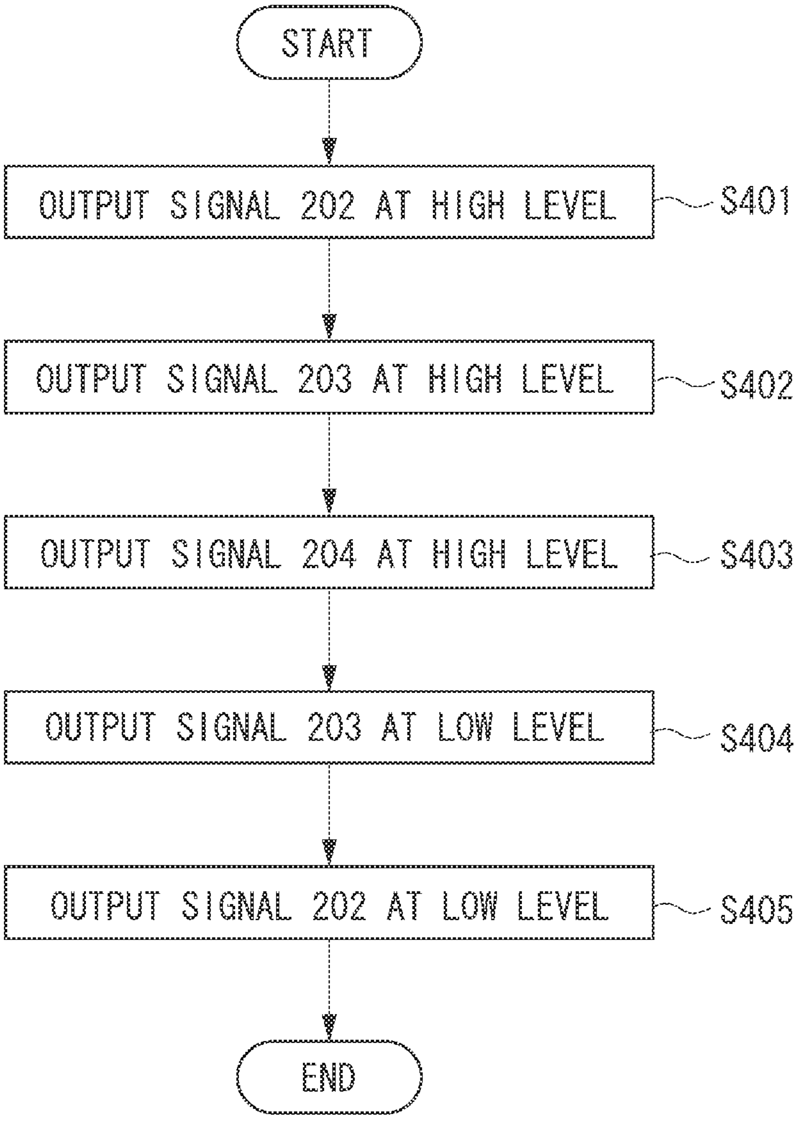
FIG. 4 is a control flow according to the exemplary embodiment.

FIG. 4 illustrates a control flow performed by the control circuit 120. In step S401, the control circuit 120 outputs the charge/discharge control signal 202 at the high level (corresponding to the timing t202 illustrated in FIG. 2). The operation at this timing is performed during a preparation period before the recording apparatus starts a print operation. In step S402, the control circuit 120 outputs the charge control signal 203 at the high level (corresponding to the timing t204 illustrated in FIG. 2). At this timing, a capping of the recording head 101 is removed.

In S403, the control circuit 120 outputs the head drive control signal 204 at the high level (corresponding to the timings t205 to t206 illustrated in FIG. 2). This timing is within a period in which the recording head 101 performs the scanning and discharges the ink. This period corresponds to, e.g., a recording period of one page. In the case of a serial type recording apparatus, the recording period of the head drive control signal 204 includes a scanning recording period and a blank period. For example, during the scanning recording period, to record 100 dots (100 columns) at a predetermined frequency by a plurality of the recording elements, a rectangular signal with 100 pulses is output to the recording elements. In the blank period which is provided during the scanning recording period, the head drive control signal 204 is at the low level. Regarding the above description, a period at the low level is to be expressed from the timings t205 to t206 illustrated in FIG. 2, however, for giving a brief description, the period at the low level is omitted.

In step S404, the control circuit 120 outputs the charge control signal 203 at the low level (corresponding to the timing t207 illustrated in FIG. 2). At this timing, the recording head 101 returns to a standby position.

In step S405, the control circuit 120 outputs the charge/discharge control signal 202 at the low level (corresponding to the timing t213 illustrated in FIG. 2). At this timing, the recording head 101 is capped, for example. Further, when a state shifts to that the recording head 101 is not used, the control circuit 120 outputs the charge/discharge control signal 202 at the low level.

Figure 5:
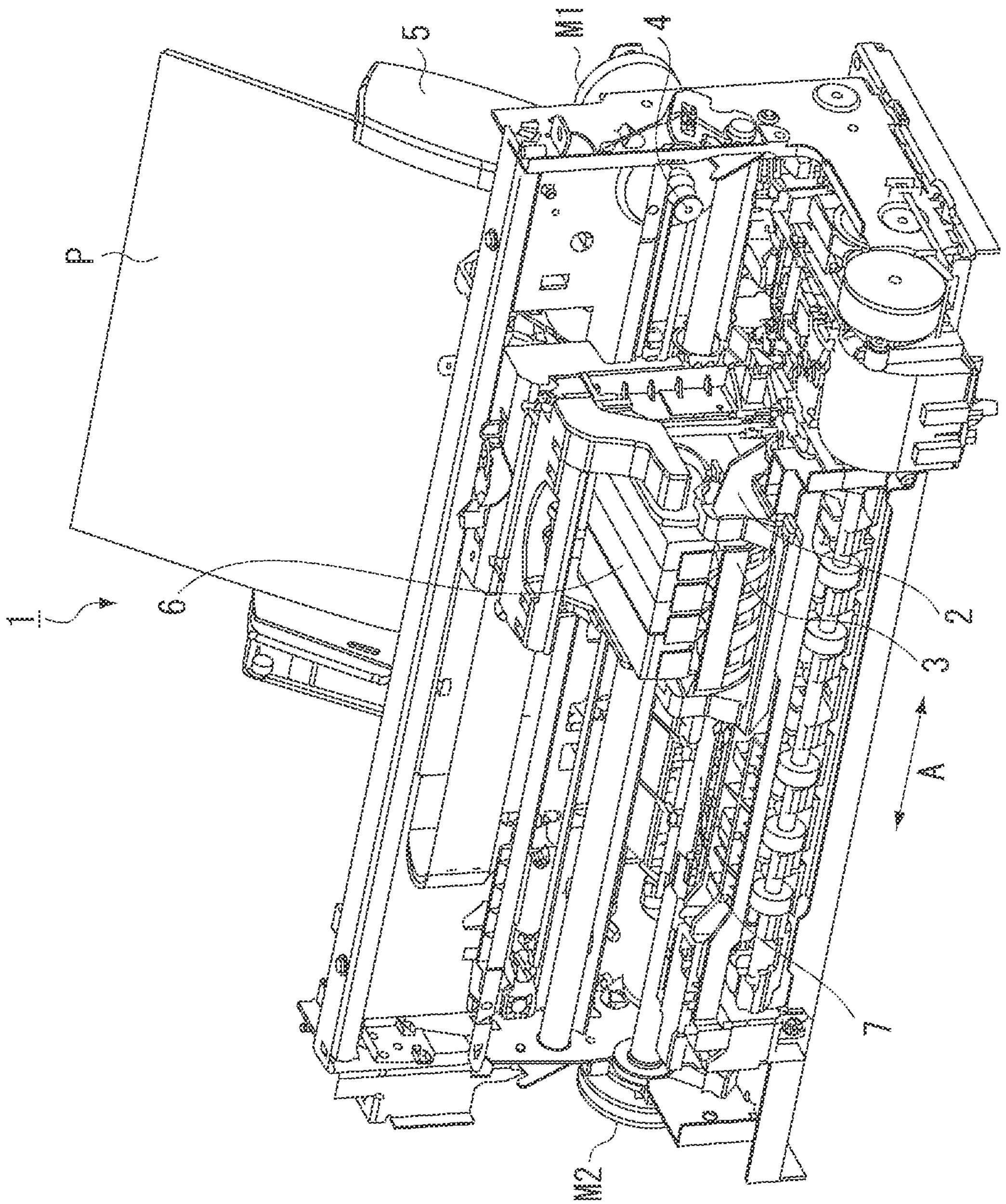
FIG. 5 is a perspective view illustrating the recording apparatus according to the exemplary embodiment.

Next, a description is given of an inkjet recording apparatus which is applied to the above described exemplary embodiment. FIG. 5 is a perspective view illustrating an inkjet recording apparatus 1. In the inkjet recording apparatus 1 (hereinafter, referred to as a recording apparatus), a recording head 3 that discharges the ink and performs the recording according to an inkjet system is mounted on a carriage 2. The recording head 3 corresponds to the recording head 101 illustrated in FIGS. 1 and 3. A transmission mechanism 4 transmits drive force generated by a carriage motor M1 to the carriage 2 so that the carriage 2 is reciprocated in a direction indicated by an arrow A. At the time of recording, a sheet feeding mechanism 5 feeds a recording medium (e.g., recording paper) P, and conveys the recording medium P to a recording position. At the recording position, the recording head 3 performs scanning, and discharges the ink to the recording medium P to perform the recording. A conveyance roller 7 conveys the recording medium P, and is driven by a conveyance motor M2. During a period between the scanning operations by the recording head 3, the conveyance roller 7 conveys the recording medium P. The above described control circuit 120 performs control of the carriage motor M1, the conveyance motor M2, the recording data, and a transfer operation of the recording data to the recording head 3.

The carriage 2 in the recording apparatus 1 can mount not only the recording head 3 but also an ink cartridge 6 that stores the ink to be supplied to the recording head 3 thereon. The ink cartridge 6 is detachable mounted to the carriage 2.

Juncture surfaces between the carriage 2 and the recording head 3 may properly come into contact with each other to accomplish and maintain predetermined electrical connection. The recording head 3 applies energy to the recording element (electrothermal conversion device) according to the head drive control signal 204, thereby discharging the ink from a plurality of discharge ports (e.g., 128 ports) and performing the recording. Therefore, the recording head 3 includes the recording element (H1 in FIG. 1) corresponding to each discharge port.

In the exemplary embodiment, the description is given of the example in which the load is a recording head and the apparatus is a recording apparatus. However, the present invention is not limited to the above described configuration. For example, the load supplied by the power supply circuit may be a motor, a heater, or an integrated circuit having a CPU. Further, the apparatus may be a copying machine, a computer apparatus, a display apparatus, or the like.

Further, the description is given of the power supply circuit using the bias resistor transistor (digital transistor). However, the power supply circuit may use another type transistor.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-148010 filed Jun. 22, 2009, which is hereby incorporated by reference herein in its entirety.

What is claimed is:

1. An apparatus which includes a load, the apparatus comprising:

a power source circuit configured to generate a voltage for driving the load;

a capacitor which is connected to a supply line for supplying electric power to the load from the power source circuit and configured to stabilize a potential of the load;

a first supply circuit which can supply electric power smaller than maximum electric energy of the load to the capacitor and can discharge a charge from the capacitor;

a second supply circuit which can supply electric power larger than the maximum electric energy of the load to the capacitor;

a control circuit configured to control each of the first supply circuit and the second supply circuit;

a holding circuit configured to hold information based on the control of the first supply circuit; and a signal output circuit configured to output a signal for controlling the second supply circuit based on the information held by the holding circuit.

2. The apparatus according to claim 1, wherein, when the potential of the capacitor is lowered than a predetermined potential, the information held by the holding circuit is initialized.

3. The apparatus according to claim 1, wherein the load is a recording head and the apparatus is a recording apparatus.

4. The apparatus according to claim 1, wherein the information includes at least first information and second information, and wherein, in a case where the first information is held by the holding circuit, the signal output circuit outputs a signal for a charge operation of the second supply circuit and, in a case where the second information is held by the holding circuit, the signal output circuit does not output the signal for the charge operation of the second supply circuit.

5. The apparatus according to claim 1, wherein the first supply circuit and the second supply circuit are connected to the capacitor and are arranged parallel to each other.

6. The apparatus according to claim 2, wherein, in a case where the information held by the holding circuit is initialized, the signal output circuit does not output the signal for a charge operation of the second supply circuit.

7. The apparatus according to claim 1, wherein, in a case where the voltage of the capacitor is lowered than a predetermined voltage the signal output circuit does not output a signal for a charge operation of the second supply circuit.

8. The apparatus according to claim 1, further comprising:

a detecting circuit configured to detect a voltage of the capacitor; and a reset circuit configured to reset the information held by the holding circuit based on a result of detecting by the detecting circuit.

9. An apparatus which includes a load, the apparatus comprising:

a power source circuit configured to generate a voltage for driving the load;

a capacitor which is connected to a supply line for supplying electric power to the load from the power source circuit and configured to stabilize a potential of the load;

a first supply circuit which can supply electric power smaller than maximum electric energy of the load to the capacitor and can discharge a charge from the capacitor;

a second supply circuit which can supply electric power larger than the maximum electric energy of the load to the capacitor;

a control circuit configured to control each of the first supply circuit and the second supply circuit, for charging the capacitor;

a detecting circuit configured to detect a voltage of the capacitor;

a holding circuit configured to hold information indicating that the first supply circuit has charged the capacitor;

a reset circuit configured to reset the information held by the holding circuit in a case where the voltage of the capacitor is lowered than a predetermined voltage; and a signal output circuit configured to output a control signal to the second supply circuit for performing the charge of the capacitor in a case where the holding circuit holds the information.

10. The apparatus according to claim 9, wherein the signal output circuit does not output the control signal to the second supply circuit in a case where the information held by the holding circuit is reset.

11. The apparatus according to claim 9, wherein the load is a recording head and the apparatus is a recording apparatus.

12. The apparatus according to claim 9, wherein the first supply circuit and the second supply circuit are connected to the capacitor and are arranged parallel to each other.

13. The apparatus according to claim 9, wherein, after the power source circuit starts generating the voltage, the control circuit causes the first supply circuit to start charging the capacitor before causing the second supply circuit to start charging the capacitor.

14. The apparatus according to claim 9, wherein the control circuit outputs a charge control signal to the first supply circuit, and the holding circuit holds the information based on the charge control signal.

15. The apparatus according to claim 9, wherein the signal output circuit includes a logical operation circuit which receives a signal output from the holding circuit and a signal output from the control circuit.

16. An apparatus which includes a load, the apparatus comprising:

a power supply unit configured to supply electric power for driving the load, the power supply unit including a first supply circuit being capable of supplying first electric power and a second supply circuit being capable of supplying second electric power which is larger than the first electric power;

a capacitor connected to a part between the power supply unit and the load, and configured to be charged using electric power supplied by the power supply unit;

a control unit configured to output, after charge processing of the capacitor using the first electric power supplied by the first supply circuit is performed, an instruction signal which causes the second supply circuit to perform charge processing of the capacitor using the second electric power; and an output unit configured to output, based on an input of the instruction signal output from the control unit, an execution signal which causes the apparatus to perform the charge processing of the capacitor using the second electric power supplied by the second supply circuit, to the second supply circuit, wherein, in a case where voltage of the capacitor is smaller than a predetermined reference voltage, the output unit does not output the execution signal to the second supply circuit regardless of whether the instruction signal is input.

17. The apparatus according to claim 16, wherein the output unit comprises a determining unit configured to determine whether the voltage of the capacitor is smaller than the predetermined reference voltage, and wherein the output unit outputs the execution signal based on a result of determination by the determining unit and the instruction signal.

18. The apparatus according to claim 16, wherein the apparatus is a recording apparatus and the load is a recording head.

19. The apparatus according to claim 16, wherein the first supply circuit and the second supply circuit are connected to the capacitor and are arranged parallel to each other.

20. The apparatus according to claim 16, wherein the first electric power is smaller than a maximum electric power consumed by the load when the load is driven, and wherein the second electric power is larger than a maximum electric power consumed by the load when the load is driven.

* * * * *